United States Patent Office 3,672,989
Patented June 27, 1972

3,672,989
POROUS LAYER OF A SECONDARY ELECTRON MULTIPLIER AND A METHOD OF MANUFACTURING THE SAME
Ryuya Toyonaga, Kohza-gun, and Kazuo Sato, Tokyo, Japan, assignors to Nippon Hoso Kyokai, Tokyo, Japan
No Drawing. Filed July 29, 1969, Ser. No. 845,882
Claims priority, application Japan, Aug. 3, 1968, 43/54,634
Int. Cl. C23c 13/00
U.S. Cl. 117—224
2 Claims

ABSTRACT OF THE DISCLOSURE

As a material for a porous layer of a secondary electron multiplier used for instance in a secondary electron conductive type camera tube or a secondary electron multiplier tube, it is desirable to use a metal oxide such as magnesium oxide, aluminum oxide or the like, which is chemically and physically stable. However, in general, a metal oxide has considerably high evaporation temperature so that vacuum evaporation under low vacuum of such oxide is difficult. In the method of the invention by utilizing an eutectic phenomenon of such metal oxide with secondary electron emissive substances having comparatively low evaporation temperature and being a nature of easiness of deposition under low vacuum, it is easily achieved to evaporate such a metal oxide under low vacuum. Thus a superior porous layer for use for instance in a secondary electron multiplier can be formed, which does not lose the porous property in a succeeding heat treatment during the process of manufacturing a multiplier tube.

BACKGROUND OF THE INVENTION

(1) Field of the invention

The present invention relates to a porous layer of a secondary electron multiplier, particularly to a porous layer consisting of a metal oxide such as magnesium oxide, aluminum oxide or the like, which is used as a secondary electron multiplying part of a secondary electron multiplying tube or as a target of a secondary electron conductive type camera tube, further to a method of manufacturing the same by vacuum evaporation process.

(2) Description of the prior art

Hitherto, as porous layers of a secondary electron multiplier with high gain to be used for an electron multiplying device such as a secondary electron multiplying tube or a target of a secondary electron conductive type camera tube or the like, vacuum deposited porous layers obtained by low-vacuum evaporation of potassium chloride KCl, sodium chloride NaCl or the like, on a surface of a support in an inert atmosphere are widely used. However, the resultant porous layers obtained by vacuum evaporation of these substances have high hygroscopic property due to the property of the material which constitutes the layer, so that they are readily influenced by the temperature and humidity and therefore the handling must be effected very carefully. For instance, if the conventional porous layer is heat-treated at about 400° C. under high vacuum, the porosity is lost. Therefore, when such porous layer is used for a target and a secondary electron conductive type camera tube is manufactured, it is difficult to manufacture such type camera tube having high sensitive photoelectric surface, because heating temperature in gas exhausting process, which is necessary for cleaning the part of the glass surface which forms the photoelectric surface, must be maintained for example below 300° C. It is desirable to use metal oxide such as magnesium oxide MgO or aluminum oxide $Al_2O_3$ which is chemically and physically stable and provides high gain, however, such metal oxide has considerably high evaporation temperature, so that a porous layer cannot be obtained by an ordinary vacuum evaporation process wherein basket or boat is used for evaporation source. Henceforth, in manufacturing a porous layer of mganesium oxide MgO, heretofore, so-called smoke process has been used wherein magnesium Mg is burned in air to form smoke of MgO, then the smoke is deposited like soot on a support to form a porous layer. While this process is a simple method because of merely burning magnesium in air and depositing the smoke of magnesium oxide MgO, it is not practically used nowadays owing to the difficulty of controlling the thickness, porosity, surface characteristic and the like of the porous layer, and further to the tendency of forming cracks and unevenness, etc., despite the superiority of its material.

SUMMARY OF THE INVENTION

The method according to the present invention comprises melting or sintering a second electron emissive metal oxide such as magnesium oxide MgO, aluminum oxide $Al_2O_3$ or calcium oxide CaO, etc., which has high melting point and is hardly evaported into a porous layer under low vacuum, together with at least one secondary electron emissive substance such as cryolite $Na_3AlF_6$, potassium chloride KCl and similar secondary electron emissive substance which has lower melting point than the metal oxide and forms with the metal oxide a solid solution or a sintered mass thereby reducing its melting point by eutectic phenomenon to a temperature at which the evaporation takes place more easily under low vacuum, subsequently depositing under low vacuum thus obtained solid solution or sintered mass onto asupport to form a physically and chemically stable porous layer.

Generally, heating temperature which is necessary for gas exhausting step in the manufacturing steps of a camera tube, is preferably from 350° C. to 400° C., because a preferable temperature for manufacturing photoelectric surface is equal to or more than 350° C., while above 400° C. glass deformation becomes too large.

As mentioned above, a porous layer obtained by depositing potassium chloride KCl or sodium chloride NaCl in vacuo has been heretofore used for a secondary electron multiplier, but such a layer loses the porosity at the above-mentioned temperature. Now, according to the present invention a sufficiently heat resistant layer can be obtained without losing its porosity at all at the above-mentioned heating temperature, because a layer of a secondary electron multiplier is formed by using, as an evaporating material, a solid solution or a sintered mass consisting of the conventional material and a metal oxide having a higher melting point.

In addition, by using eutectic phenomenon, evaporation temperature can be decreased to such an extent that the evaporation can easily be effected under low vacuum. Accordingly, it becomes able to evaporate the metal oxides which were difficult to evaporate, into a porous layer and a porous layer of desired shape can easily be obtained from the metal oxides.

As apparent from the above descriptions, an object of the present invention is to obtain a physically and chemically stable porous layer of a secondary electron multiplier which is able to pertain its porous property during the succeeding heat treatment in the manufacturing steps of camera tubes or the like.

Another object of the present invention is to easily obtain, as a secondary electron emissive material, a porous layer from a metal oxide such as magnesium oxide MgO, aluminum oxide $Al_2O_3$, calcium oxide CaO or the like which is chemically and physically stable but has too high melting point to form a porous layer by vacuum evaporation process.

Further object is to obtain a stable porous layer having an improved heat resistance in which the porosity is not lost in the heat treatment for producing the tube, by forming a solid solution or a sintered mass from secondary electron emissive materials such as cryolite $$Na_3AlF_6$$

or potassium chloride KCl which form easily a porous layer by vacuum evaporation process but are liable to lose the porosity by an elevated temperature in a heat treatment for exhausting air in a step for manufacturing the tube when a secondary electron multiplier target of a secondary electron conductive type camera tube is manufactured, and the above described metal oxides and evaporating the resulting solid solution or sintered mass onto a support by evaporation process.

Still further object of the present invention is to provide a method for manufacturing easily the above described physically and chemically stable porous layer for multiplying a secondary electron through an evaporation means by utilizing eutectic phenomenon of different secondary electron emissive materials having different evaporation temperatures.

Still further object of the present invention is to provide a manufacturing method wherein a physically and chemically stable porous layer of a secondary electron multiplier as mentioned above can easily be formed by using eutectic phenomenon of variable sorts of secondary electron emissive substances having different evaporation temperatures in vacuum evaporation process.

Still further object of the invention is to manufacture easily a camera tube, etc., wherein the physically and chemically stable porous layer for multiplying secondary electron, which is easily formed, is used for a target electrode.

DESCRIPTION OF PREFERRED EMBODIMENTS

In manufacturing a vacuum deposited layer by evaporation process, it is well-known that a vacuum deposited porous layer can be obtained in an atmosphere of low vacuum and that a glassy layer can be obtained in an atmosphere of high vacuum.

An advantage of vacuum evaporation process is that a layer of desired shape, thickness, porosity and surface characteristic, etc., can be obtained by controlling a degree of vacuum, evaporation temperature, a distance between the evaporating material and the support to be deposited and the like in the vessel. Therefore, if secondary electron emissive metal oxides which have been known to be chemically and physically stable as a material are used for the material for producing a porous layer of secondary electron multiplier, the above described disadvantages can be solved.

However, a metal oxide having an excellent property as this sort of secondary electron emissive material has high evaporation temperature under vacuum of 1 torr, for example, 1,800° C. for magnesium oxide MgO, so that evaporation under low vacuum which is necessary to obtain a porous layer is quite difficult. The reason is that a boat of molybdenum Mo, tantalum Ta or tungsten W or a basket coated with alumina cannot withstand to the high temperature necessary for the above-mentioned vacuum evaporation.

According to the present invention a solid solution or a sintered mass is formed from a metal oxide which is difficult to vacuum evaporate into a porous layer, and a secondary electron emissive substance which has lower melting point than the metal oxide and is easy to vacuum evaporate under low vacuum and is suited for forming a solid solution or a sintered mass with the metal oxide. The melting point of such solid solution or sintered mass decreases in proportion to a mixing ratio of the above-mentioned two substances by eutectic phenomenon and becomes to the lowest melting point (eutectic point) at a particular mixing ratio.

Thus, above-mentioned metal oxide which is difficult to be evaporated under low vacuum becomes possible to be easily evaporated into a porous layer in vacuo by the well-known vacuum evaporation process, so that chemically and physically stable porous layer of a secondary electron multiplier can be manufactured.

As a secondary electron emissive substance suitable for forming a solid solution with metal oxide such as magnesium oxide MgO, aluminum oxide $Al_2O_3$ or calcium oxide CaO, etc., cryolite $Na_3AlF_6$ may be mentioned. If the cryolite $Na_3AlF_6$ form a solid solution with e.g. aluminum oxide $Al_2O_3$, the eutectic point exists at the point of aluminum oxide $Al_2O_3$ content of 16 wt. percent and the melting point decreases to 935° C. and as the amount of aluminum oxide increases, the melting point approaches to the melting point of aluminum oxide $Al_2O_3$. Since the melting point of aluminum oxide $Al_2O_3$ per se is 2,050° C., a porous layer of aluminum oxide alone is difficult to be manufactured by vacuum evaporation process, but if a solid solution or a sintered mass is formed by mixing a proper amount of cryolite $Na_3AlF_6$ the melting point decreases by eutectic phenomenon as mentioned above, so that the evaporation deposition under low vacuum can be carried out by vacuum evaporation process to obtain physically and chemically stable porous layer of a secondary electron multiplier with any layer thickness, porosity and the like.

The above described solid solution or sintered mass can be formed at a relatively low temperature by pulverizing the above described two substances, mixing thoroughly the pulverized substances in a proper proportion and then heating the mixture, for example, in a platinum crucible.

The invention will now be explained in more detail with reference to the following examples, which should not be understood to limit the invention by any meaning.

EXAMPLE 1

A porous layer of a secondary electron multiplier is formed by using magnesium oxide MgO as metal oxide, which is widely known as a secondary electron emissive material. 6 mg. of magnesium oxide MgO and 6 mg. of cryolite $Na_3AlF_6$ are mixed thoroughly and the mixture is charged in a platinum crucible and heated at a temperature of about 1,100° C. in air for one hour to effect melting and sintering thereby a solid mass is formed. The mass is crushed and charged in a vessel for evaporation such as a tantalum boat or a basket coated with alumina and then heated to a temperature of about 1,000° C. in an atmosphere of gaseous argon A. under low vacuum of about 1 torr. Then the crushed substance is evaporated and deposited on a support to form a porous layer in a soot form to form a porous layer of multiplier having a thickness of 25μ. A distance for the evaporation deposition is 110 mm. Since evaporation temperature of magnesium oxide MgO under 1 torr is 1,800° C. as mentioned above, vacuum evaporation under low vacuum at a temperature of about 1,000° C. is impossible. However, according to the present invention, vacuum evaporation under low vacuum is readily possible and shape of the surface, thickness and porosity of the layer, etc., can easily be controlled and a stable porous film of a secondary electron multiplier sufficiently usable in practice can be manufactured.

The experimental data of easiness in forming a porous layer when mixing proportion of magnesium oxide MgO and cryolite $Na_3AlF_6$ is varied in this example are shown in the following Table 1.

TABLE 1

| Weight ratio $MgO/Na_3AlF_6$ | Easiness of vacuum evaporation into a porous layer | Operation temperature for vacuum evaporation, °C. |
|---|---|---|
| 100/0 | Vacuum evaporation is impossible in a boat of Ta, Mo, or the like. | |
| 70/30 | Vacuum evaporation is possible | 1,300 |
| 50/50 | Vacuum evaporation is easy and layer quality is good. | 1,100 |
| 35/65 | do | 1,000 |

As apparent from the above explanation a metal oxide which is physically and chemically stable as a secondary electron emissive material and hitherto known as difficult to vacuum evaporate to form a porous layer, can now easily be used for example for a target, etc., of a secondary electron conductive type camera tube by vacuum evaporation process wherein a secondary electron emissive metal oxide which is difficult to be evaporated to form a porous layer despite its physically and chemically stability is mixed and melted or sintered with a secondary electron emissive substance which forms a eutectic point and lowers the melting point as well as the evaporation temperature, subsequently the melted or sintered mass is evaporated under low vacuum to form a porous layer.

Furthermore, according to the present invention an excellent porous layer for multiplying a secondary electron, which has a heat resistance, can easily be produced. As mentioned above, when a porous layer composed of cryolite alone is subjected to a heat treatment at about 400° C. under a high vacuum the porosity is lost, whereas a porous layer obtained by mixing 75% by weight of cryolite and 25% by weight of MgO and heating the mixture to form a solid solution or a sintered mass and then evaporating the resulting solid solution or sintered mass under low vacuum, has an improved heat resistance and the porosity is not lost even if a heat treatment at about 400° C. is effected under a high vacum.

The experimental data of heat resistance of the porous films are shown in the following Table 2.

| Weight ratio $Na_3AlF_6/MgO$ | Heat resistance of porous layers (at 400° C.) | Operation temperature for vacuum evaporation, °C. |
|---|---|---|
| 100/0 | Bad, fluctuation of layer thickness is large. | 800 |
| 95/5 | Slightly bad, surface characteristic deteriorates, fluctuation of layer thickness is little. | 800 |
| 75/25 | Good, layer thickness does not vary | 900 |
| 65/35 | do | 1,000 |

Namely, as seen from the above description, when a secondary electron emissive substance which can easily be evaporated to form a porous layer, but loses the porosity through a heat treatment is mixed with a substance which can form a solid solution or sintering mass and improves the heat resistance and the resulting mixture is melted or sintered and the resulting product is evaporated under low vacuum, a porous layer having an excellent heat resistance can easily be obtained and consequently, if the porous layer is subjected to a heat treatment in the gas exhausting step, the porosity is not lost and an excellent secondary electron conductive type camera tube having highly photosensitive photoelectric surface can easily be manufactured.

A solid solution or a sintered mass consisting of cryolite or potassium chloride and a metal oxide other than magnesium oxide can use eutectic phenomena by selecting the mixing proportion properly and can easily be evaporated to form a porous layer and porous layers of a secondary electron multiplier manufactured according to the present invention by using a variety of combinations of the aforementioned substances and a method of manufacturing thereof are also included in the present invention.

Various changes and modifications of the invention can be made and, to the extent that such variations incorporate the spirit of this invention, they are intended to be included within the scope of the appended claims.

What is claimed is:

1. A method of manufacturing a porous layer for multiplying a second a electron which comprises mixing magnesium oxide MgO and cryolite $Na_3AlF_6$, heating the mixture into a solid solution or a sintered mass comprising 65–25 wt. percent of magnesium oxide MgO and 35–75 wt. percent of cryolite $Na_3AlF_6$ at a temperature lower than the melting temperatures of magnesium oxide and cryolite, evaporating, in a substantially evacuated atmosphere, the resulting solid solution or sintered mass, and depositing said solid solution or sintered mass or a support to form a chemically and physically stable porous layer for multiplying secondary electrons.

2. An electron multiplier device wherein a porous layer of a secondary electron multiplier is used in secondary electron multiplier portions, the porous layer being formed by evaporating a solid solution or a sintered mass consisting of 65–25 wt. percent of magnesium oxide MgO and 35–75 wt. percent of cryolite $Na_3AlF_6$ and depositing the same porously onto a support by vacuum evaporation process.

References Cited

UNITED STATES PATENTS

| 2,198,329 | 4/1940 | Bruining et al. | 117—223 X |
| 2,813,807 | 11/1957 | Levi | 117—224 |

FOREIGN PATENTS

| 585,458 | 2/1947 | Great Britain | 117—224 |

RALPH S. KENDALL, Primary Examiner

C. WESTON, Assistant Examiner

U.S. Cl. X.R.

117—223